United States Patent [19]

Greene

[11] Patent Number: 4,594,592
[45] Date of Patent: Jun. 10, 1986

[54] AIRPLANE SAFE TAKE-OFF ROTATION INDICATOR

[76] Inventor: Leonard M. Greene, P.O. Box 550, White Plains, N.Y. 10602

[21] Appl. No.: 569,478

[22] Filed: Jan. 9, 1984

[51] Int. Cl.[4] .................. G08B 21/00; G08B 23/00; G08G 5/00; G06F 15/48
[52] U.S. Cl. .................. 340/959; 73/178 T; 340/963; 340/968; 340/969; 364/427
[58] Field of Search .................. 364/427; 73/178 T; 33/232; 244/181; 340/959, 969, 967, 975, 963, 968

[56] References Cited

U.S. PATENT DOCUMENTS

| | | | |
|---|---|---|---|
| 2,922,982 | 1/1960 | Hoekstra | 340/959 |
| 3,077,110 | 2/1963 | Gold | 340/959 |
| 3,086,394 | 4/1963 | Peck | 73/178 T |
| 3,174,710 | 3/1965 | Hoekstra | 73/178 T |
| 3,176,264 | 3/1965 | Wail | 340/969 |
| 3,241,362 | 3/1966 | Scott | 73/178 T |
| 3,691,356 | 9/1972 | Miller | 244/181 |
| 4,021,010 | 5/1977 | Bliss | 73/178 T |
| 4,130,015 | 12/1978 | Grover | 73/178 T |

FOREIGN PATENT DOCUMENTS

| | | | |
|---|---|---|---|
| 973953 | 9/1975 | Canada | 340/969 |
| 1119832 | 11/1963 | United Kingdom | 73/178 T |

OTHER PUBLICATIONS

'Takeoff Monitors Compete for Market', 7/28/58, p. 77, Aviation Week.
'Takeoff Progress Indicator', Jack Andresen et al., 4/8-11/58, p. 2, Society of Automotive Eng.

Primary Examiner—John W. Caldwell, Sr.
Assistant Examiner—Brent A. Swarthout
Attorney, Agent, or Firm—Edward A. Sokolski

[57] ABSTRACT

A device for indicating that an airplane has reached a safe speed for take-off rotation. The device indicates when both the airspeed equals or exceeds a preselected minimum airspeed and the ground speed equals or exceeds the preselected minimum airspeed less a preselected margin.

4 Claims, 1 Drawing Figure

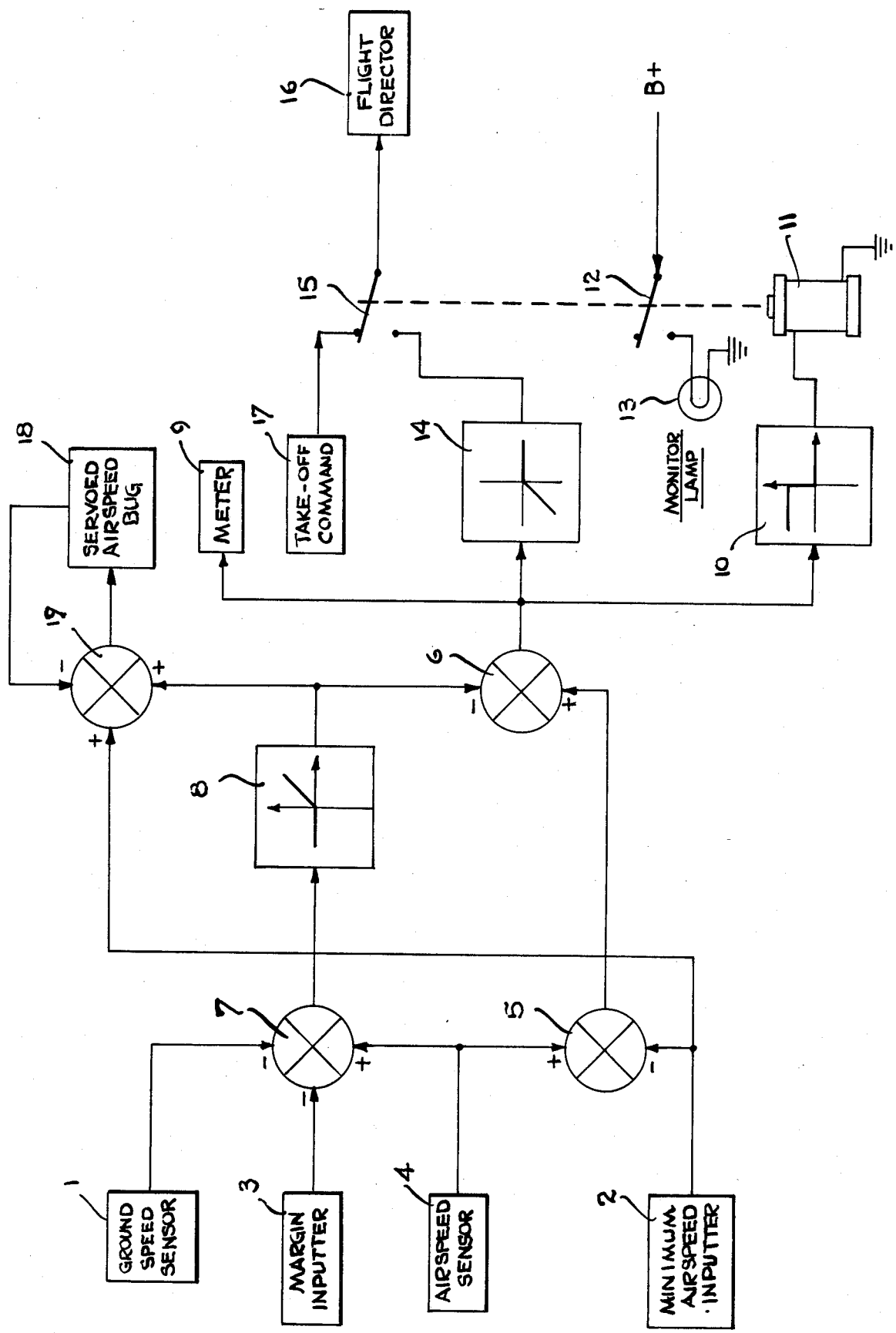

AIRPLANE SAFE TAKE-OFF ROTATION INDICATOR

BACKGROUND OF THE INVENTION

1. Field of the Invention

This invention pertains to aircraft instrumentation, and more particularly to devices for indicating when a sufficient speed has been obtained for safe take-off rotation of the aircraft.

2. Description of the Prior Art

Airspeed sensors and indicators have been used to indicate when an airplane has attained a predetermined airspeed deemed sufficient for safe rotation of the aircraft for take-off. However, if part of the airspeed is due to a headwind which decreases suddenly immediately after take-off, insufficient airspeed may remain for safe continuation of the take-off. As a consequence, rather than depend only upon airspeed as an indication that a safe speed has been reached for rotation, a safer procedure would be to use both an airspeed sensor and indicator and a ground speed sensor and indicator which indicates that a predetermined ground speed has also been reached or exceeded.

SUMMARY OF THE INVENTION

This invention uses an air speed sensor and a ground speed sensor in combination to determine and indicate when a safe speed has been obtained for take-off rotation of the aircraft.

BRIEF DESCRIPTION OF THE DRAWING

The sole FIGURE is a schematic drawing of the invention.

DESCRIPTION OF THE PREFERRED EMBODIMENT

Referring to the sole FIGURE, ground speed sensor 1 is a device for sensing and outputting the speed of the airplane relative to the ground. The ground speed sensor, for instance, may be simply a tachometer attached to one of the wheels on the aircraft. Minimum airspeed inputter 2 is a means for the input by the pilot of a preselected minimum airspeed which is to be attained by the aircraft before the device indicates that the aircraft may safely be rotated, that is, that the nose may be pitched up for take-off. Typically, the pilot using the temperature, loaded weight of the aircraft, and performance data for the aircraft first determines from charts or other sources the minimum safe airspeed for take-off rotation. The pilot then inputs this minimum safe airspeed into minimum airspeed inputter 2. The data may be input directly, or it may be input indirectly by the setting of the position of the take-off rotation "bug" on the airspeed indicator, the position of which bug is sensed by minimum airspeed inputter 2.

Margin inputter 3 is a means for the pilot to preselect and input an appropriate safety margin for the minimum ground speed relative to the minimum airspeed for take-off rotation. Typically the margin would be a value of between 5-10 knots so that the minimum ground speed for take-off rotation would be 5-10 knots less than the airspeed input by minimum airspeed inputter 2. In normal operation, the margin selected by margin inputter 3 would be set once by the pilot or by other personnel and would remain unchanged in most circumstances. Airspeed sensor 4 is a means for sensing and outputting the aircraft airspeed. A Pitot tube located at an appropriate place on the fuselage could be used for this purpose when combined with an analog-to-digital convertor.

In the preferred embodiment, data from each of the items numbered 1-4 in the sole FIGURE is output in either digital or analog form.

Summer 5 adds, with the signs indicated, the outputs of airspeed sensor 4 and minimum airspeed inputter 2, and outputs the result to summer 6. Summer 7 adds, with the signs indicated, the outputs of ground speed sensor 1, margin inputter 3 and airspeed sensor 4 and outputs the sum to clipper 8. Clipper 8 gives an output signal proportional to its input for positive input signals and gives zero output for negative input signals. Summer 6 adds together the outputs of clipper 8 and adder 5 to output a take-off rotation signal. The take-off rotation signal from summer 6 is greater than or equal to zero only when both the airspeed is greater than the selected minimum air speed and the ground speed of the aircraft is greater than or equal to the selected minimum airspeed less the preselected margin. Accordingly, the output of summer 6 may be used in any of a number of different ways to indicate that sufficient speed has been attained for safe take-off rotation. The output of summer 6 is negative until such speed is attained.

As indicated in the sole FIGURE, in the preferred embodiment, the output of summer 6 can be used to drive meter 9, which meter has a center position of zero and is calibrated in knots, having a zero center position so as to indicate to the pilot the increase in speed required to attain sufficient speed for take-off rotation or, conversely, to indicate the excess of the aircraft speed over this minimum required speed.

In a second embodiment also depicted in the sole FIGURE, the output of summer 6 is input into function generator 10 whose output is a fixed, positive voltage for all negative inputs and zero output for all positive inputs. The output of generator 10 is connected to solenoid 11. When the output of summer 6 is less than zero, function generator 10 outputs a positive voltage which causes solenoid 11 to operate relay 12 which in turn applies voltage to monitor lamp 13. Thus, when both the airspeed is greater than the minimum airspeed and the ground speed is greater than the minimum air speed less the margin, solenoid 11 is turned off, which opens relay 12, which turns off the monitor lamp which, in turn, indicates to the pilot that a safe speed for take-off rotation has been reached.

As further shown in the sole FIGURE, in a third embodiment, the output of summer 6 is applied to function generator 14 to provide a means for indicating that a safe speed for rotation had been reached. In this embodiment, function generator 14 outputs a signal proportional to the input signal for input signals less than zero and outputs a zero signal for all positive input signals. So long as relay 11 is operated by function generator 10, the output of function generator 14 is connected by relay 15 to flight director 16, which flight director, in turn, outputs a negative pitch command which gradually approaches zero as the aircrft approachs take-off rotation speed. When the safe speed for rotation is reached, and the input of flight director 16 is switched through relay 16 to the output of take-off command generator 17 which supplies a pitch-up command to the flight director of about 10° in the typical situation for take-off rotation.

Rather than use the output of summer 6 to control the means for indicating that the safe speed has been attained, the output of minimum airspeed inputter 2 could, in still another embodiment, be combined in summer 19 with the output of clipper 8 which output would then be used to drive servo airspeed bug 18. Bug 18 is an indicator mounted on the airspeed indicator used by the pilot. The bug is servoed to the output of summer 17 so that its position is adjusted in accord with that output. As a consequence, the position of the bug would be moved up slightly in those circumstances where the headwinds were such that when the minimum air speed had been reached, the ground speed less the margin would not have yet been met or exceeded. As a consequence, the pilot who would be watching the airspeed indicator to see when the speed was equal to or greater than the amount indicated by the bug would not begin take-off rotation until both the minimum airspeed and ground speed requirements had been met.

I claim:

1. A system for indicating the attainment of a minimum safe speed for take-off rotation of an airplane rolling down a runway in situations where a head wind may decrease after take-off comprising:

airspeed sensing means for sensing the airspeed of the aircraft and generating an airspeed signal representative thereof, ground speed sensing means for sensing the ground speed of the aircraft along the runway and generating a ground speed signal representative thereof, margin means for generating a margin signal representing a ground speed margin, minimum airspeed means for generating a minimum airspeed signal representing an operator preselected minimum airspeed, first summing means for receiving said ground speed, margin, and airspeed signals and generating a signal in accordance with the difference between said airspeed signal and the sum of said ground speed and margin signals, clipper means for receiving the output signal of said first summing means and providing a zero output signal when the difference signal output of said first summing means is less than zero and an output signal which is in accordance with the signal output of said first summing means when said first summing means output signal is greater than zero, second summing means for receiving said airspeed signal and said minimum airspeed signal and generating a signal in accordance with the difference therebetween, third summing means for receiving the outputs of said clipper means and said second summing means and providing an output signal in accordance with the difference therebetween, and indicator means for indicating the attainment of minimum safe speed for take-off rotation in response to the output of said third summing means.

2. The device defined in claim 1 wherein the indicator means comprises
   a lamp, and
   power means for supplying power to the lamp, said power means supplying power to the lamp and turning off said power when the signal is output from the signal means.

3. The device defined in claim 1 wherein the indicator means comprises a meter responsive to the output of the signal means.

4. The device defined in claim 1 and further comprising:
   a flight director,
   take-off command means for generating a take-off command for the flight director,
   and connection means responsive to the output signal of the third summing means for inputting the take-off command from the take-off command means to the flight director in response to the signal from the third summing means.

* * * * *